(12) United States Patent
Ishikawa et al.

(10) Patent No.: US 11,333,238 B2
(45) Date of Patent: May 17, 2022

(54) DRIVE APPARATUS AND OIL CHANGING METHOD

(71) Applicant: NIDEC CORPORATION, Kyoto (JP)

(72) Inventors: Yuki Ishikawa, Kyoto (JP); Shuhei Nakamatsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 1 day.

(21) Appl. No.: 16/780,909

(22) Filed: Feb. 4, 2020

(65) Prior Publication Data

US 2020/0300353 A1 Sep. 24, 2020

(30) Foreign Application Priority Data

Mar. 22, 2019 (JP) .............................. JP2019-055509

(51) Int. Cl.
| | |
|---|---|
| *F16H 57/02* | (2012.01) |
| *F16H 57/04* | (2010.01) |
| *B60K 17/04* | (2006.01) |
| *B60K 17/16* | (2006.01) |
| *F16H 48/12* | (2012.01) |
| *F16H 57/037* | (2012.01) |
| *F16H 1/20* | (2006.01) |

(52) U.S. Cl.
CPC ......... *F16H 57/0408* (2013.01); *B60K 17/16* (2013.01); *F16H 1/20* (2013.01); *F16H 48/12* (2013.01); *F16H 57/037* (2013.01)

(58) Field of Classification Search
CPC .......... F16H 1/20; F16H 48/12; F16H 57/037; F16H 57/04; F16H 57/0408; B60K 17/16
See application file for complete search history.

(56) References Cited

U.S. PATENT DOCUMENTS

| 5,246,086 A | * | 9/1993 | Yunick | ............... | F01M 11/0458 |
| | | | | | 123/196 A |
| 6,752,181 B1 | * | 6/2004 | Awad | .................. | F16H 57/0408 |
| | | | | | 141/1 |
| 7,121,389 B2 | * | 10/2006 | Manrao | ................... | F15B 11/20 |
| | | | | | 188/264 E |

(Continued)

FOREIGN PATENT DOCUMENTS

| JP | 02072299 A | * | 3/1990 | ......... F16H 57/0408 |
| JP | 2018027003 A | * | 2/2018 | |

OTHER PUBLICATIONS

Machine translation of JP 2018-27003 A obtained on Mar. 30, 2021.*

*Primary Examiner* — Adam D Rogers
(74) *Attorney, Agent, or Firm* — Hauptman Ham, LLP

(57) ABSTRACT

A drive apparatus includes a motor; a reduction gear connected to the motor; a differential connected to the reduction gear, for rotating an axle about a differential axis; a housing including a gear housing portion housing the reduction gear and the differential; and an oil housed in the gear housing portion. The differential includes a gear for rotating about the differential axis. An end portion of the gear is lower than the reduction gear, and is configured to soak in the oil. The housing includes an oil drain hole and an oil feed hole for joining an interior of the housing and a space outside of the housing, a first stopper member removably in the oil drain hole, and a second stopper member removably in the oil feed hole. Each of the oil drain hole and the oil feed hole is in a portion of the gear housing portion.

17 Claims, 6 Drawing Sheets

(56) References Cited

U.S. PATENT DOCUMENTS

| | | | |
|---|---|---|---|
| 9,512,915 B2* | 12/2016 | Ito | F16H 57/0408 |
| 10,363,907 B2* | 7/2019 | Erwin | F01M 11/0458 |
| 10,495,207 B2* | 12/2019 | Schnurr | F16H 57/0408 |
| 10,514,088 B2* | 12/2019 | Bassis | F16H 57/0408 |
| 10,862,365 B2* | 12/2020 | Yamaguchi | H02K 5/20 |
| 10,903,705 B2* | 1/2021 | Ishikawa | H02K 1/32 |
| 10,910,918 B2* | 2/2021 | Nakamatsu | H02K 7/116 |
| 2013/0169073 A1 | 7/2013 | Nagahama et al. | |
| 2016/0061312 A1* | 3/2016 | Aldrich | F16H 57/0408 74/606 R |
| 2021/0044173 A1* | 2/2021 | Ishikawa | B60K 17/24 |

* cited by examiner

DRIVE APPARATUS AND OIL CHANGING METHOD

CROSS-REFERENCE TO RELATED APPLICATIONS

The present invention claims priority under 35 U.S.C. § 119 to Japanese Application No. 2019-055509 filed on Mar. 22, 2019 the entire content of which is incorporated herein by reference.

FIELD OF THE INVENTION

The present invention relates to a drive apparatus and an oil changing method.

BACKGROUND

In a known drive apparatus for a vehicle, an oil is housed in an interior of a case thereof. Such a drive apparatus for a hybrid vehicle is known.

In such a drive apparatus as mentioned above, the oil housed in the interior of the case is sometimes changed. In that case, the oil housed in the interior of the case is drained out through an oil drain hole defined in the case. However, the oil housed in the interior of the case may not be easily drained out through the oil drain hole if the oil drain hole is simply defined in the case. In this case, a change of the oil housed in the interior of the case may not be easy.

SUMMARY

A drive apparatus according to a preferred embodiment of the present invention is a drive apparatus that causes an axle of a vehicle to rotate, the drive apparatus including a motor; a reduction gear connected to the motor; a differential connected to the reduction gear, and arranged to rotate the axle about a differential axis; a housing including a gear housing portion arranged to house the reduction gear and the differential in an interior thereof; and an oil housed in the interior of the gear housing portion. The differential includes a gear arranged to rotate about the differential axis. An end portion of the gear on a lower side in a vertical direction is located lower than the reduction gear in the vertical direction, and is arranged to soak in the oil in the interior of the gear housing portion. The housing includes an oil drain hole and an oil feed hole each of which is arranged to join an interior of the housing and a space outside of the housing to each other, a first stopper member removably fitted in the oil drain hole to close the oil drain hole, and a second stopper member removably fitted in the oil feed hole to close the oil feed hole. Each of the oil drain hole and the oil feed hole is defined in a portion of the gear housing portion which houses the differential.

A drive apparatus according to another preferred embodiment of the present invention is a drive apparatus that causes an axle of a vehicle to rotate, the drive apparatus including a motor; a reduction gear connected to the motor; a differential connected to the reduction gear, and arranged to rotate the axle about a differential axis; a housing including a motor housing portion arranged to house the motor in an interior thereof, and a gear housing portion arranged to house the reduction gear and the differential in an interior thereof; and an oil housed in the interior of the motor housing portion and the interior of the gear housing portion. The interior of the motor housing portion and the interior of the gear housing portion are joined to each other. The differential includes a gear arranged to rotate about the differential axis. An end portion of the gear on a lower side in a vertical direction is located lower than the reduction gear in the vertical direction, and is arranged to soak in the oil in the interior of the gear housing portion. The housing includes an oil drain hole arranged to join an interior of the housing and a space outside of the housing to each other, and a first stopper member removably fitted in the oil drain hole to close the oil drain hole. The oil drain hole is defined in an end portion of the housing on the lower side in the vertical direction.

An oil changing method according to a preferred embodiment of the present invention is an oil changing method for changing the oil housed in the interior of the gear housing portion in the above drive apparatus using an oil changer including an oil drain tube, an oil feed tube, and a filter, the oil changing method including the steps of: a) connecting the oil changer to the drive apparatus by removing the first stopper member from the oil drain hole and connecting the oil drain tube to the oil drain hole, and removing the second stopper member from the oil feed hole and connecting the oil feed tube to the oil feed hole; b) replacing the oil housed in the interior of the gear housing portion with a first oil using the oil changer; c) causing the first oil to circulate between the gear housing portion and the oil changer; and d) replacing the first oil housed in the interior of the gear housing portion with a second oil using the oil changer. In step c), the first oil is passed through the filter after flowing out of the gear housing portion and into the oil changer.

The above and other elements, features, steps, characteristics and advantages of the present disclosure will become more apparent from the following detailed description of the preferred embodiments with reference to the attached drawings.

DETAILED DESCRIPTION

Figure 1:
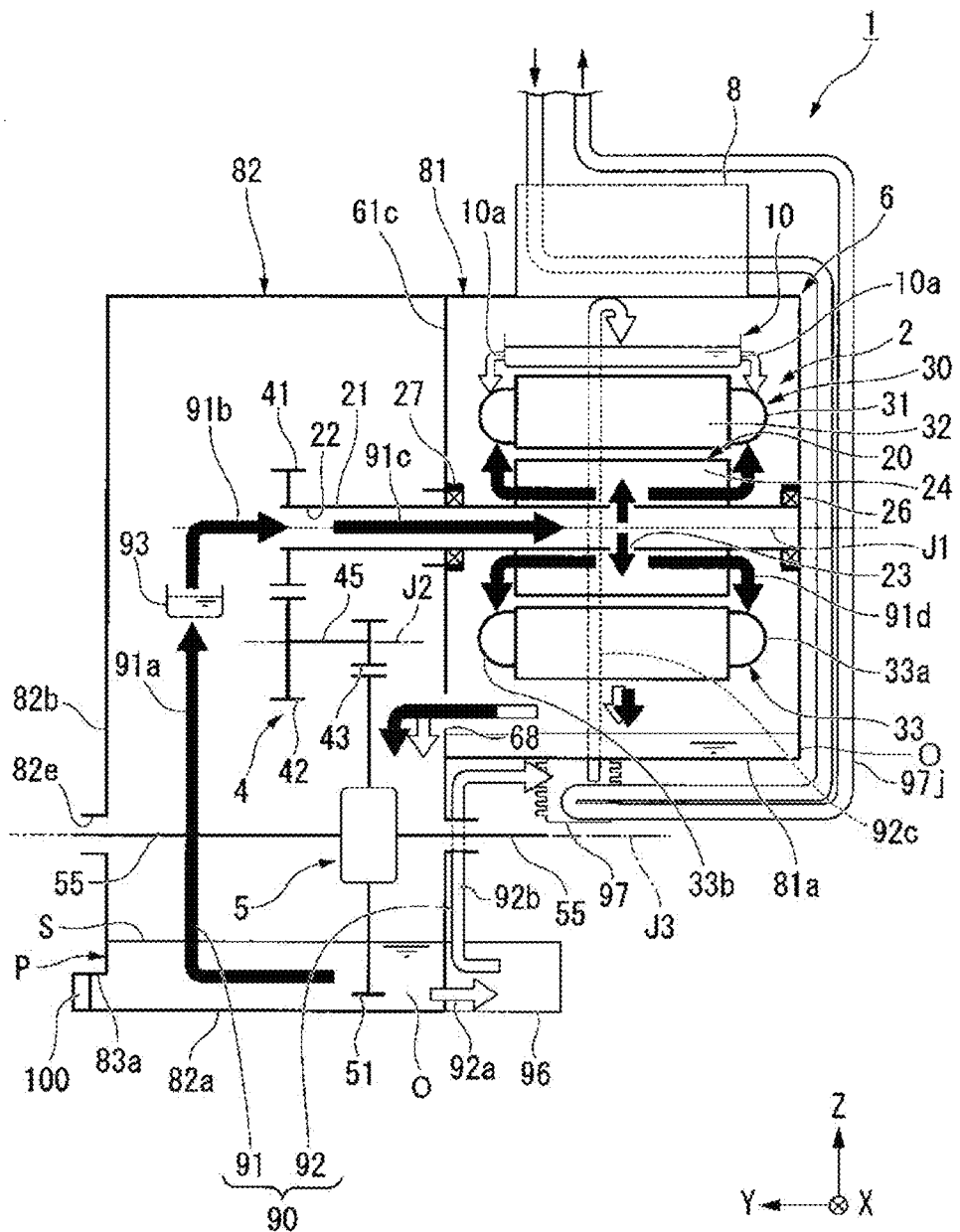
FIG. 1 is a schematic diagram illustrating the schematic structure of a drive apparatus according to a preferred embodiment of the present invention.

The following description will be made with a vertical direction being defined on the basis of positional relationships when a drive apparatus according to a preferred embodiment of the present invention illustrated in the accompanying drawings is installed in a vehicle located on a horizontal road surface. In addition, in the drawings, an xyz coordinate system is shown appropriately as a three-dimensional orthogonal coordinate system. In the xyz coordinate system, a z-axis direction corresponds to the vertical direction. A +z side corresponds to an upper side in the vertical direction, while a −z side corresponds to a lower side in the vertical direction. In the following description, the upper side and the lower side in the vertical direction will be referred to simply as the "upper side" and the "lower side", respectively. An x-axis direction corresponds to a front-rear direction of the vehicle in which the drive apparatus is installed, and is a direction perpendicular to the z-axis direction. In the preferred embodiment described below, a +x side corresponds to a forward side of the vehicle, while a −x side corresponds to a rearward side of the vehicle. A y-axis direction is a direction perpendicular to both the x-axis direction and the z-axis direction, and corresponds to a left-right direction of the vehicle, i.e., a width direction of the vehicle. In the preferred embodiment described below, a +y side corresponds to a left side of the vehicle, while a −y side corresponds to a right side of the vehicle. Each of the front-rear direction and the left-right direction is a horizontal direction perpendicular to the vertical direction.

Note that the definition of the forward and rearward sides in the front-rear direction is not limited to the definition of the preferred embodiment described below, and that the +x side and the −x side may correspond to the rearward side and the forward side, respectively, of the vehicle. In this case, the +y side corresponds to the right side of the vehicle, while the −y side corresponds to the left side of the vehicle.

A motor axis J1 shown appropriately in the drawings extends in the y-axis direction, i.e., the left-right direction of the vehicle. In the following description, unless otherwise specified, a direction parallel to the motor axis J1 will be simply referred to by the term "axial direction", "axial", or "axially", radial directions centered on the motor axis J1 will be simply referred to by the term "radial direction", "radial", or "radially", and a circumferential direction centered on the motor axis J1, i.e., a circumferential direction about the motor axis J1, will be simply referred to by the term "circumferential direction", "circumferential", or "circumferentially". It is assumed that the term "parallel" as used herein includes both "parallel" and "substantially parallel", and that the term "perpendicular" as used herein includes both "perpendicular" and "substantially perpendicular".

Figure 2:
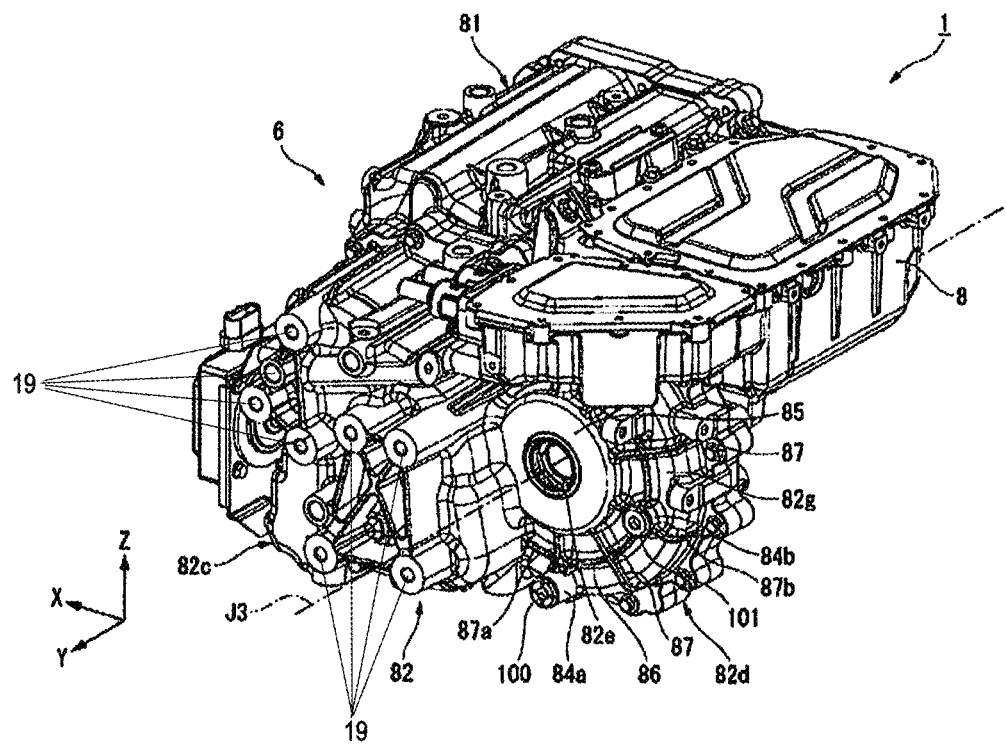
FIG. 2 is a perspective view of the drive apparatus according to a preferred embodiment of the present invention.

A drive apparatus 1 according to the present preferred embodiment illustrated in FIGS. 1 and 2 is installed in a vehicle having a motor as a power source, such as, for example, a hybrid electric vehicle (HEV), a plug-in hybrid vehicle (PHV), or an electric vehicle (EV), and is used as the power source thereof. Referring to FIG. 1, the drive apparatus 1 includes a motor 2, a reduction gear 4, a differential 5, a housing 6, and an inverter unit 8. The housing 6 includes a motor housing portion 81 arranged to house the motor 2 in an interior thereof, and a gear housing portion 82 arranged to house the reduction gear 4 and the differential 5 in an interior thereof. The gear housing portion 82 is located on the left side of the motor housing portion 81.

In the present preferred embodiment, the motor 2 is an inner-rotor motor. The motor 2 includes a rotor 20, a stator 30, and bearings 26 and 27. The rotor 20 is arranged to rotate about the motor axis J1, which extends in a horizontal direction. The rotor 20 includes a shaft 21 and a rotor body 24. Although not illustrated in the drawings, the rotor body 24 includes a rotor core, and a rotor magnet fixed to the rotor core. A torque of the rotor 20 is transferred to the reduction gear 4.

The shaft 21 is arranged to extend along an axial direction with the motor axis J1 as a center. The shaft 21 is arranged to rotate about the motor axis J1. The shaft 21 is a hollow shaft including a hollow portion 22 defined therein. The shaft 21 includes a communicating hole 23. The communicating hole 23 is arranged to extend in a radial direction to join the hollow portion 22 to a space outside of the shaft 21.

The shaft 21 is arranged to extend over the interior of the motor housing portion 81 and the interior of the gear housing portion 82 of the housing 6. An end portion of the shaft 21 on the left side is arranged to project into the interior of the gear housing portion 82. A first gear 41, which will be described below, of the reduction gear 4 is fixed to the end portion of the shaft 21 on the left side. The shaft 21 is rotatably supported by the bearings 26 and 27.

The stator 30 is arranged radially opposite to the rotor 20 with a gap therebetween. In more detail, the stator 30 is located radially outside of the rotor 20. The stator 30 includes a stator core 32 and a coil assembly 33. The stator core 32 is fixed to an inner peripheral surface of the motor housing portion 81. Although not illustrated in the drawings, the stator core 32 includes a cylindrical core back arranged to extend in the axial direction, and a plurality of teeth arranged to extend radially inward from the core back.

The coil assembly 33 is attached to the stator core 32. The coil assembly 33 includes a plurality of coils 31. Each coil 31 is attached to a separate one of the teeth of the stator core 32 with an insulator (not shown) therebetween. The coils 31 are arranged in a circumferential direction. In more detail, the coils 31 are arranged at regular intervals in the circumferential direction all the way around the motor axis J1. Although not illustrated in the drawings, the coil assembly 33 may include a binding member or the like which is used to bind the coils 31 together, and may include a passage line arranged to join the coils 31 to one another.

The coil assembly 33 includes coil ends 33a and 33b each of which is arranged to project in the axial direction from the stator core 32. The coil end 33a is arranged to project to the right side from the stator core 32. The coil end 33b is arranged to project to the left side from the stator core 32. The coil end 33a includes a portion of each of the coils 31 included in the coil assembly 33 which projects on the right side of the stator core 32. The coil end 33b includes a portion of each of the coils 31 included in the coil assembly 33 which projects on the left side of the stator core 32. In the present preferred embodiment, each of the coil ends 33a and 33b is annular, and is centered on the motor axis J1. Although not illustrated in the drawings, each of the coil ends 33a and 33b may include a binding member or the like which is used to bind the coils 31 together, and may include a passage line arranged to join the coils 31 to one another.

The bearings 26 and 27 are arranged to rotatably support the rotor 20. Each of the bearings 26 and 27 is, for example, a ball bearing. The bearing 26 is a bearing arranged to rotatably support a portion of the rotor 20 which is located on the right side of the stator core 32. In the present preferred embodiment, the bearing 26 is arranged to support a portion of the shaft 21 which is located on the right side of a portion of the shaft 21 to which the rotor body 24 is fixed. The bearing 26 is held by a wall portion of the motor housing portion 81 which covers the right side of the rotor 20 and the stator 30.

The bearing 27 is a bearing arranged to rotatably support a portion of the rotor 20 which is located on the left side of the stator core 32. In the present preferred embodiment, the bearing 27 is arranged to support a portion of the shaft 21 which is located on the left side of the portion of the shaft 21 to which the rotor body 24 is fixed. The bearing 27 is held by a partition 61c, which will be described below.

The reduction gear 4 is connected to the motor 2. In more detail, the reduction gear 4 is connected to the end portion of the shaft 21 on the left side. The reduction gear 4 is arranged to increase a torque outputted from the motor 2 in accordance with a reduction ratio while reducing the rotation speed of the motor 2. The reduction gear 4 is arranged to transfer the torque outputted from the motor 2 to the differential 5. The reduction gear 4 includes the first gear 41, a second gear 42, a third gear 43, and an intermediate shaft 45.

Figure 3:
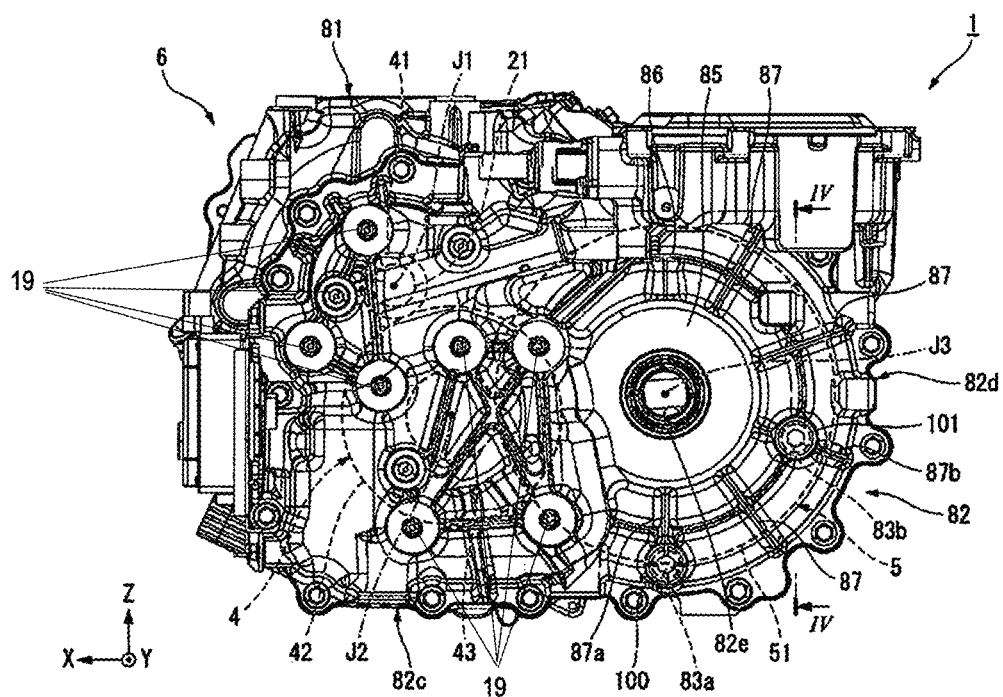
FIG. 3 is a diagram illustrating the drive apparatus according to a preferred embodiment of the present invention as viewed from a left side.

The first gear 41 is fixed to an outer circumferential surface of the end portion of the shaft 21 on the left side. The first gear 41 is arranged to rotate about the motor axis J1 together with the shaft 21. The intermediate shaft 45 is arranged to extend along an intermediate axis J2. In the present preferred embodiment, the intermediate axis J2 is parallel to the motor axis J1. Referring to FIG. 3, in the present preferred embodiment, the intermediate axis J2 is located lower than the motor axis J1. The intermediate axis J2 is located on the rearward side (i.e., the −x side) relative to the motor axis J1. The intermediate shaft 45 is arranged to rotate about the intermediate axis J2.

Referring to FIG. 1, each of the second gear 42 and the third gear 43 is fixed to an outer circumferential surface of the intermediate shaft 45. The second gear 42 and the third gear 43 are connected to each other through the intermediate shaft 45. Each of the second gear 42 and the third gear 43 is arranged to rotate about the intermediate axis J2. The second gear 42 is arranged to mesh with the first gear 41. The third gear 43 is arranged to mesh with a ring gear 51, which will be described below, of the differential 5. The second gear 42 is arranged to have an outside diameter greater than an outside diameter of the third gear 43. In the present preferred embodiment, a lower end portion of the second gear 42 is a lowermost portion of the reduction gear 4.

The torque outputted from the motor 2 is transferred to the differential 5 through the reduction gear 4. In more detail, the torque outputted from the motor 2 is transferred to the ring gear 51 of the differential 5 through, in order, the shaft 21, the first gear 41, the second gear 42, the intermediate shaft 45, and the third gear 43. The number of gears, the gear ratios of the gears, and so on can be modified in various manners in accordance with a desired reduction ratio. In the present preferred embodiment, the reduction gear 4 is a speed reducer of a parallel-axis gearing type, in which center axes of gears are arranged in parallel with each other.

The differential 5 is connected to the reduction gear 4. The differential 5 is thus connected to the motor 2 through the reduction gear 4. The differential 5 is a device arranged to transfer the torque outputted from the motor 2 to wheels of the vehicle. The differential 5 is arranged to transfer the same torque to axles 55 of left and right wheels while absorbing a difference in speed between the left and right wheels when the vehicle is turning. The differential 5 is arranged to rotate the axles 55 about a differential axis J3. The drive apparatus 1 is thus arranged to cause the axles 55 of the vehicle to rotate.

In the present preferred embodiment, the differential axis J3 is parallel to the motor axis J1. That is, in the present preferred embodiment, an axial direction of the differential axis J3 is the same as the axial direction of the motor axis J1. Referring to FIG. 3, in the present preferred embodiment, the differential axis J3 is located on the rearward side (i.e., the −x side) relative to both the motor axis J1 and the intermediate axis J2. The differential axis J3 is located lower than the motor axis J1. The differential axis J3 is located at substantially the same position in the vertical direction as the intermediate axis J2. The differential axis J3 is located slightly higher than the intermediate axis J2.

The differential 5 is located on the rearward side (i.e., the −x side) of the reduction gear 4 in the interior of the gear housing portion 82. The differential 5 includes the ring gear 51, a gear housing (not shown), a pair of pinion gears (not shown), a pinion shaft (not shown), and a pair of side gears (not shown). The ring gear 51 is a gear arranged to rotate about the differential axis J3. The ring gear 51 is arranged to mesh with the third gear 43. The torque outputted from the motor 2 is thus transferred to the ring gear 51 through the reduction gear 4. A lower end portion of the ring gear 51 is located lower than the reduction gear 4. In the present preferred embodiment, the lower end portion of the ring gear 51 is a lowermost portion of the differential 5.

The housing 6 is an exterior casing of the drive apparatus 1. Referring to FIG. 1, the housing 6 includes the partition 61c, which is arranged to divide the interior of the motor housing portion 81 and the interior of the gear housing portion 82 in the axial direction. The partition 61c includes a partition opening 68. The interior of the motor housing portion 81 and the interior of the gear housing portion 82 are joined to each other through the partition opening 68.

An oil O is housed in an interior of the housing 6. In more detail, the oil O is housed in the interior of the motor housing portion 81 and the interior of the gear housing portion 82. An oil pool P, i.e., a pool of the oil O, is arranged in a lower region in the interior of the gear housing portion 82. An oil surface S of the oil pool P is located higher than the lower end portion of the ring gear 51. As a result, the lower end portion of the ring gear 51 soaks in the oil O in the interior of the gear housing portion 82. The oil surface S of the oil pool P is located lower than the differential axis J3 and the axles 55.

The oil O in the oil pool P is sent to the interior of the motor housing portion 81 through an oil passage 90, which will be described below. The oil O sent to the interior of the motor housing portion 81 is gathered in a lower region in the interior of the motor housing portion 81. At least a portion of the oil O gathered in the interior of the motor housing portion 81 travels into the gear housing portion 82 through the partition opening 68 to return to the oil pool P.

Note that, when an oil is herein described as being housed in a specific portion, it means that the oil is located in the specific portion at least at one time while the motor is in operation, and the oil may not be located in the specific portion when the motor is at rest. For example, when the oil O is described as being housed in the interior of the motor housing portion 81 in the present preferred embodiment, it means that the oil O is located in the interior of the motor housing portion 81 at least at one time while the motor 2 is in operation, and all of the oil O in the interior of the motor housing portion 81 may have traveled into the gear housing portion 82 through the partition opening 68 when the motor 2 is at rest. Note that a portion of the oil O sent to the interior of the motor housing portion 81 through the oil passage 90, which will be described below, may be left in the interior of the motor housing portion 81 when the motor 2 is at rest.

Also note that, when the lower end portion of the ring gear is herein described as soaking in the oil in the interior of the gear housing portion, it means that the lower end portion of the ring gear soaks in the oil in the interior of the gear housing portion at least at one time while the motor is in operation, and the lower end portion of the ring gear may not soak in the oil in the interior of the gear housing portion at one time while the motor is in operation or the motor is at rest. For example, as a result of the oil O in the oil pool P being sent to the interior of the motor housing portion 81 through the oil passage 90, which will be described below, the oil surface S of the oil pool P may be lowered to such an extent that the lower end portion of the ring gear 51 does not temporarily soak in the oil O.

The oil O is arranged to circulate through the oil passage 90, which will be described below. The oil O is used to lubricate the reduction gear 4 and the differential 5. The oil O is also used to cool the motor 2. An oil equivalent to a lubricating oil (ATF: Automatic Transmission Fluid) for an automatic transmission having a relatively low viscosity is preferably used as the oil O so that the oil O can perform functions of a lubricating oil and a cooling oil.

Figure 4:
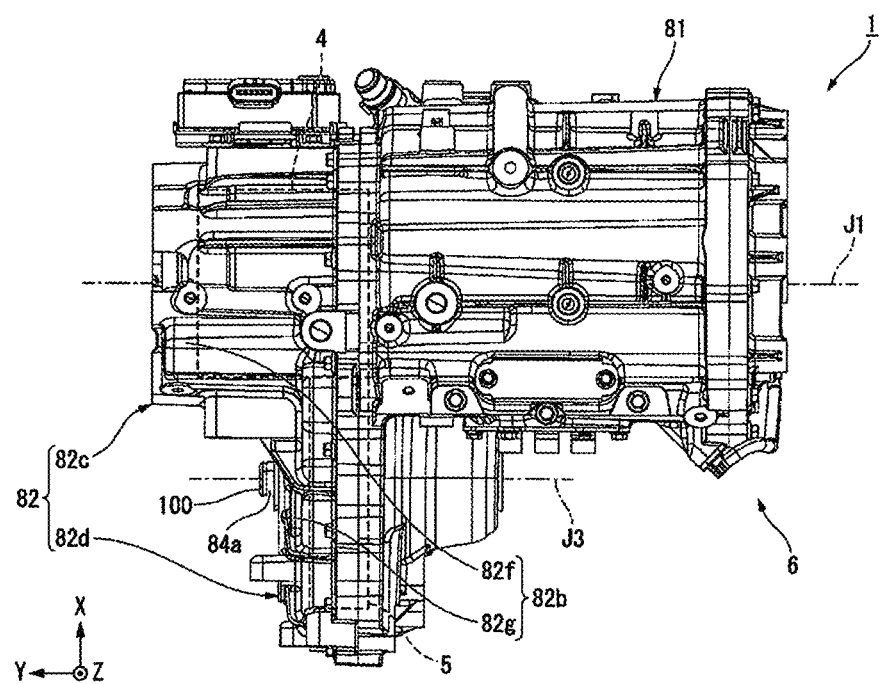
FIG. 4 is a diagram illustrating the drive apparatus according to a preferred embodiment of the present invention as viewed from an upper side.

Referring to FIG. 1, a bottom portion 82a of the gear housing portion 82 is located lower than a bottom portion 81a of the motor housing portion 81. This makes it easier for the oil O sent from the interior of the gear housing portion 82 to the interior of the motor housing portion 81 to flow into the interior of the gear housing portion 82 through the partition opening 68. Referring to FIGS. 2 to 4, the gear housing portion 82 is arranged to extend in the front-rear direction. Referring to FIG. 4, the gear housing portion 82 is arranged to project to the rearward side from an end portion of the motor housing portion 81 on the left side. The gear housing portion 82 includes a first housing portion 82c and a second housing portion 82d. The first housing portion 82c is a portion of the gear housing portion 82 which is located on the left side of the motor housing portion 81. The second housing portion 82d is a portion of the gear housing portion 82 which is arranged to project to the rearward side relative to the motor housing portion 81. The first housing portion 82c is arranged to project to the left side relative to the second housing portion 82d. The reduction gear 4 is housed in an interior of the first housing portion 82c. The differential 5 is housed in an interior of the second housing portion 82d. A forward portion of the differential 5 is located in the interior of the first housing portion 82c.

The first housing portion 82c includes a first side wall portion 82f located on the left side of the reduction gear 4. The second housing portion 82d includes a second side wall portion 82g located on the left side of the differential 5. That is, the gear housing portion 82 includes the first side wall portion 82f and the second side wall portion 82g. The first side wall portion 82f is located on the left side relative to the second side wall portion 82g. In the present preferred embodiment, the second side wall portion 82g corresponds to a side wall portion located on one side of the differential 5 in the axial direction of the differential axis J3. In the present preferred embodiment, the first side wall portion 82f and the second side wall portion 82g together define a left side wall portion 82b, which is a wall portion of the housing 6 on the left side.

Figure 5:
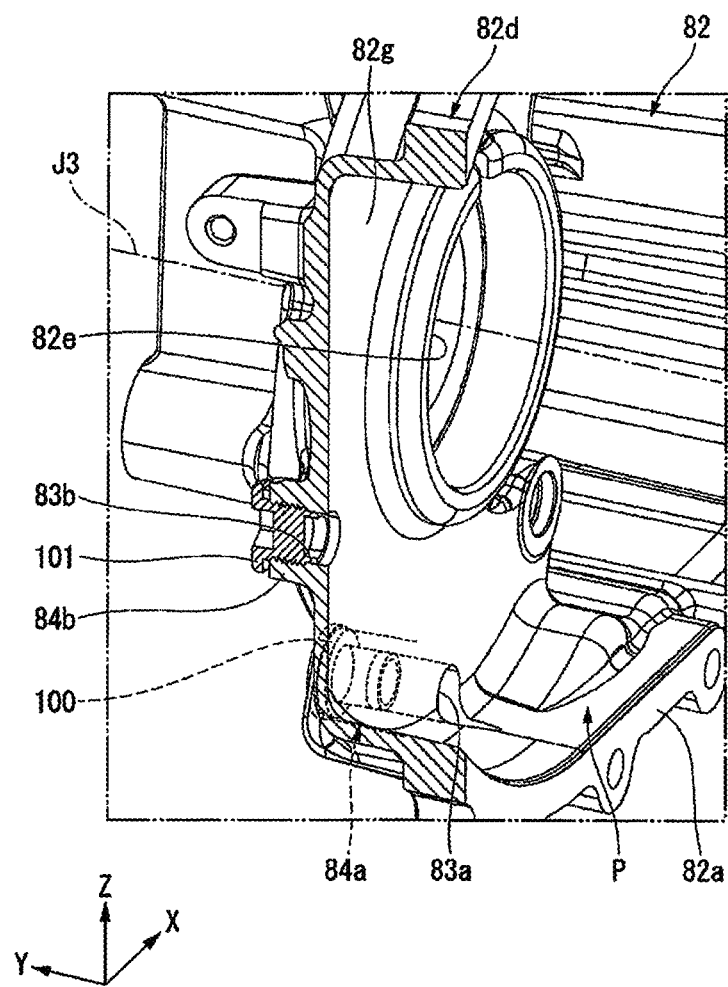
FIG. 5 is a perspective sectional view illustrating a portion of a gear housing portion according to a preferred embodiment of the present invention.

Referring to FIG. 5, the second side wall portion 82 g includes a hole portion 82 e arranged to pass through the second side wall portion 82 g in the axial direction. The hole portion 82 e is a circular hole centered on the differential axis J3. Although not illustrated in the drawings, one of the axles 55 is passed through the hole portion 82 e. Referring to FIG. 2, a peripheral portion 85 of the second side wall portion 82 g, which lies around the hole portion 82 e, is arranged to project to the left side. The peripheral portion 85 is substantially annular, and is centered on the differential axis J3. As illustrated in FIG. 2, the housing 6 comprises a plurality of mounting holes 19 for mounting the drive apparatus 1 on a body of the vehicle. As illustrated in FIG. 3, two of the mounting holes 19 overlap the ring gear 51 when viewed along the differential axis J3.

A first rib 86, a plurality of second ribs 87, a tubular oil drain portion 84a, and a tubular oil feed portion 84b are arranged on an outside surface of the second side wall portion 82g. In the present preferred embodiment, the outside surface of the second side wall portion 82g is a surface of the second side wall portion 82g on the left side. Each of the first rib 86 and the second ribs 87 is arranged to project to the left side from the outside surface of the second side wall portion 82g. The first rib 86 is located outside of the peripheral portion 85 in radial directions centered on the differential axis J3, and is arranged to extend in a circumferential direction about the differential axis J3.

Each second rib 87 is arranged to extend from an outer edge portion of the peripheral portion 85 outward in a radial direction centered on the differential axis J3. The second ribs 87 are arranged apart from one another in the circumferential direction about the differential axis J3. Each second rib 87 is arranged to cross the first rib 86. In the present preferred embodiment, a middle portion of the second rib 87 in a longitudinal direction thereof is joined to the first rib 86.

Each of the tubular oil drain portion 84a and the tubular oil feed portion 84b is tubular, and is arranged to project to the left side from the outside surface of the second side wall portion 82g. An end portion of the tubular oil drain portion 84a on the left side is located on the left side relative to an end portion of the tubular oil feed portion 84b on the left side. In the present preferred embodiment, each of the tubular oil drain portion 84a and the tubular oil feed portion 84b is, for example, cylindrical. Each of the tubular oil drain portion 84a and the tubular oil feed portion 84b is arranged to open to the left side.

The tubular oil drain portion 84a is arranged at a lower end portion of the second side wall portion 82g. The tubular oil drain portion 84a is located on the lower side of the peripheral portion 85. The tubular oil drain portion 84a is located outside of the first rib 86 in a radial direction centered on the differential axis J3. One of the second ribs 87, a second rib 87a, which extends downward from a lower end portion of the peripheral portion 85 is joined to an upper end portion of the tubular oil drain portion 84a.

The tubular oil feed portion 84b is located higher than the tubular oil drain portion 84a and on the rearward side relative to the tubular oil drain portion 84a. The tubular oil feed portion 84b is located lower than the differential axis J3. The tubular oil feed portion 84b is located at the same position as the first rib 86 in a radial direction centered on the differential axis J3. The tubular oil feed portion 84b divides the first rib 86 in the circumferential direction about the differential axis J3. Thus, sections of the first rib 86 are joined to the tubular oil feed portion 84b on both sides of the tubular oil feed portion 84b in the circumferential direction about the differential axis J3. One of the second ribs 87, a second rib 87b, is joined to the tubular oil feed portion 84b. The tubular oil feed portion 84b divides the second rib 87b in a radial direction centered on the differential axis J3. Thus, sections of the second rib 87b are joined to the tubular oil feed portion 84b on both sides of the tubular oil feed portion 84b in the radial direction centered on the differential axis J3.

Referring to FIG. 5, the housing 6 includes an oil drain hole 83a, an oil feed hole 83b, a first stopper member 100, and a second stopper member 101. Each of the oil drain hole 83a and the oil feed hole 83b is a hole arranged to join the interior of the housing 6 and a space outside of the housing 6 to each other. Each of the oil drain hole 83a and the oil feed hole 83b is, for example, a circular hole. Each of the oil drain hole 83a and the oil feed hole 83b is defined in a portion of the gear housing portion 82 which houses the differential 5.

Note that, in the present specification, a "portion of a gear housing portion which houses a differential" includes a portion of the gear housing portion which is located at the same position as the differential in a direction in which the reduction gear and the differential are arranged, and a portion of the gear housing portion which is located on an opposite side of the differential with respect to the reduction gear in the direction in which the reduction gear and the differential are arranged. The portion of the gear housing portion which is located at the same position as the differential in the direction in which the reduction gear and the differential are arranged includes a portion of the gear housing portion which coincides with the differential when viewed along the axial direction of the differential axis.

In the present preferred embodiment, the portion of the gear housing portion 82 which houses the differential 5 includes a portion of the gear housing portion 82 which is located at the same position as the differential 5 in the front-rear direction, i.e., a direction in which the reduction gear 4 and the differential 5 are arranged, and a portion of the gear housing portion 82 which is located on the rearward side of the differential 5 in the front-rear direction. That is, in the present preferred embodiment, the portion of the gear housing portion 82 which houses the differential 5 includes a whole portion of the gear housing portion 82 which extends from the same position as that of a forward end portion of the differential 5 in the front-rear direction to a rear end of the gear housing portion 82. In the present preferred embodiment, the forward end portion of the differential 5 corresponds to a forward end portion of the ring gear 51. In the present preferred embodiment, the portion of the gear housing portion 82 which houses the differential 5 includes the whole second housing portion 82d and a rearward portion of the first housing portion 82c.

In the present preferred embodiment, each of the oil drain hole 83a and the oil feed hole 83b is defined in the second housing portion 82d. In more detail, each of the oil drain hole 83a and the oil feed hole 83b is defined in the second side wall portion 82g. Each of the oil drain hole 83a and the oil feed hole 83b is arranged to pass through the second side wall portion 82g in the axial direction. Each of a wall surface of the oil drain hole 83a and a wall surface of the oil feed hole 83b includes a female screw portion.

The oil drain hole 83a includes a space inside of the tubular oil drain portion 84a. The oil drain hole 83a is arranged to extend from a left opening of the tubular oil drain portion 84a to an inside surface of the second side wall portion 82g in the axial direction. That is, the oil drain hole 83a is arranged to pass through the tubular oil drain portion 84a and the second side wall portion 82g in the axial direction. In the present preferred embodiment, the inside surface of the second side wall portion 82g is a surface of the second side wall portion 82g on the right side.

The oil drain hole 83a is defined in a lower end portion of the portion of the gear housing portion 82 which houses the differential 5. In the present preferred embodiment, the oil drain hole 83a is defined in the lower end portion of the second side wall portion 82g. Thus, in the present preferred embodiment, the oil drain hole 83a is defined in a lower end portion of the housing 6. An inside opening of the oil drain hole 83a is located at a lower end of the inside surface of the second side wall portion 82g. In the present preferred embodiment, the inside opening of the oil drain hole 83a corresponds to an opening of the oil drain hole 83a on the right side. A lower end portion of the inside opening of the oil drain hole 83a is joined to the bottom portion 82a of the gear housing portion 82. The inside opening of the oil drain hole 83a is arranged to open into the oil pool P.

Referring to FIG. 3, the oil drain hole 83a is located on the lower side of the differential axis J3 when viewed along the axial direction of the differential axis J3. In the present preferred embodiment, a center of the oil drain hole 83a lies at the same position as the differential axis J3 in the front-rear direction. The center of the oil drain hole 83a lies at substantially the same position as a lower end portion of the differential 5, i.e., the lower end portion of the ring gear 51, in the vertical direction. An upper portion of the oil drain hole 83a is arranged to overlap with the ring gear 51 when viewed along the axial direction of the differential axis J3.

Referring to FIG. 5, the oil feed hole 83b includes a space inside of the tubular oil feed portion 84b. The oil feed hole 83b is arranged to extend from a left opening of the tubular oil feed portion 84b to the inside surface of the second side wall portion 82g. That is, the oil feed hole 83b is arranged to pass through the tubular oil feed portion 84b and the second side wall portion 82g in the axial direction. An inside opening of the oil feed hole 83b is, for example, located higher than the oil pool P. In the present preferred embodiment, the inside opening of the oil feed hole 83b corresponds to an opening of the oil feed hole 83b on the right side. The oil feed hole 83b is located higher than the oil drain hole 83a. The oil feed hole 83b is located lower than the differential axis J3. The oil feed hole 83b is located lower than the axle 55 which is passed through the hole portion 82e. Referring to FIG. 3, the oil feed hole 83b is located on the rearward side relative to the differential axis J3. The whole oil feed hole 83b is arranged to overlap with the ring gear 51 when viewed along the axial direction of the differential axis J3.

In the present preferred embodiment, each of the first stopper member 100 and the second stopper member 101 is a bolt. The first stopper member 100 is screwed to the female screw portion arranged in the wall surface of the oil drain hole 83a from outside the gear housing portion 82. The first stopper member 100 is thus removably fitted in the oil drain hole 83a to close the oil drain hole 83a. In the present preferred embodiment, the first stopper member 100 is fitted in the tubular oil drain portion 84a. A screw head portion of the first stopper member 100 is exposed to the space outside of the housing 6.

The second stopper member 101 is screwed to the female screw portion arranged in the wall surface of the oil feed hole 83b from outside the gear housing portion 82. The second stopper member 101 is thus removably fitted in the oil feed hole 83b to close the oil feed hole 83b. In the present preferred embodiment, the second stopper member 101 is fitted in the tubular oil feed portion 84b. A screw head portion of the second stopper member 101 is exposed to the space outside of the housing 6.

Referring to FIG. 1, the drive apparatus 1 includes the oil passage 90, through which the oil O circulates in the interior of the housing 6. The oil passage 90 is a channel of the oil O along which the oil O is fed from the oil pool P to the motor 2 and is led back to the oil pool P. The oil passage 90 is arranged to extend over both the interior of the motor housing portion 81 and the interior of the gear housing portion 82.

Note that the term "oil passage" as used herein refers to a channel of an oil. Therefore, the concept of "oil passage" includes not only a "flow passage", in which a steady flow of an oil in one direction is generated, but also a channel in which the oil is allowed to temporarily stay, and a channel along which the oil drips. Examples of the channel in which the oil is allowed to temporarily stay include a reservoir arranged to store the oil.

The oil passage 90 includes a first oil passage 91 and a second oil passage 92. Each of the first oil passage 91 and the second oil passage 92 is arranged to circulate the oil O in the interior of the housing 6. The first oil passage 91 includes a scraping-up channel 91a, a shaft feed channel 91b, an intra-shaft channel 91c, and an intra-rotor channel 91d. In addition, a first reservoir 93 is arranged in a channel of the first oil passage 91. The first reservoir 93 is arranged in the interior of the gear housing portion 82.

The scraping-up channel 91a is a channel along which the oil O is scraped up from the oil pool P by rotation of the ring gear 51 of the differential 5 to be received by the first reservoir 93. The first reservoir 93 is arranged to open upward. The first reservoir 93 receives a portion of the oil O which has been scraped up by the ring gear 51. The first reservoir 93 also receives portions of the oil O which have been scraped up by the second gear 42 and the third gear 43 in addition to the ring gear 51 when, for example, a liquid surface of the oil pool P is at a high level, e.g., immediately after the motor 2 is started.

The shaft feed channel 91b is arranged to lead the oil O from the first reservoir 93 into the hollow portion 22 of the shaft 21. The intra-shaft channel 91c is a channel along which the oil O passes in the hollow portion 22 of the shaft 21. The intra-rotor channel 91d is a channel along which the oil O passes through the communicating hole 23 of the shaft 21 and an interior of the rotor body 24, and is scattered to the stator 30.

In the intra-shaft channel 91c, a centrifugal force is applied to the oil O in an interior of the rotor 20 due to rotation of the rotor 20. Thus, the oil O is continuously scattered radially outward from the rotor 20. In addition, the scattering of the oil O generates a negative pressure in a channel in the interior of the rotor 20, causing the oil O gathered in the first reservoir 93 to be sucked into the interior of the rotor 20, so that the channel in the interior of the rotor 20 is filled with the oil O.

A portion of the oil O which has reached the stator 30 absorbs heat from the stator 30. Having cooled the stator 30, the oil O drips downward, and is gathered in the lower region in the interior of the motor housing portion 81. The oil O gathered in the lower region in the interior of the motor housing portion 81 travels into the gear housing portion 82 through the partition opening 68 defined in the partition 61c. In the above-described manner, the first oil passage 91 feeds the oil O to the rotor 20 and the stator 30.

In the second oil passage 92, the oil O is lifted from the oil pool P up to the upper side of the stator 30, and is fed to the stator 30. That is, the second oil passage 92 is arranged to feed the oil O to the stator 30 from the upper side of the stator 30. An oil pump 96, a cooler 97, and a second reservoir 10 are arranged along the second oil passage 92. The second oil passage 92 includes a first flow passage 92a, a second flow passage 92b, and a third flow passage 92c.

Each of the first flow passage 92a, the second flow passage 92b, and the third flow passage 92c is defined in a wall portion of the housing 6. The first flow passage 92a is arranged to join the oil pool P and the oil pump 96 to each other. The second flow passage 92b is arranged to join the oil pump 96 and the cooler 97 to each other. The third flow passage 92c is arranged to extend upward from the cooler 97. The third flow passage 92c is defined in the wall portion of the motor housing portion 81. Although not illustrated in the drawings, the third flow passage 92c includes a feed opening that opens into the interior of the motor housing portion 81 on the upper side of the stator 30. The feed opening feeds the oil O into the interior of the motor housing portion 81.

The oil pump 96 is an electric pump driven by electricity. The oil pump 96 is arranged to suck the oil O from the oil pool P through the first flow passage 92a, and to feed the oil O to the motor 2 through the second flow passage 92b, the cooler 97, the third flow passage 92c, and the second reservoir 10.

The cooler 97 is arranged to cool the oil O passing through the second oil passage 92. Each of the second flow passage 92b and the third flow passage 92c is connected to the cooler 97. The second flow passage 92b and the third flow passage 92c are joined to each other through an internal flow passage of the cooler 97. A coolant pipe 97j, in which a coolant cooled by a radiator (not shown) is caused to pass, is connected to the cooler 97. A portion of the oil O which passes through an interior of the cooler 97 is cooled through heat exchange with the coolant passing through the coolant pipe 97j. The inverter unit 8 is arranged along a channel of the coolant pipe 97j. The coolant, which passes through the coolant pipe 97j, cools the inverter unit 8.

The second reservoir 10 defines a portion of the second oil passage 92. The second reservoir 10 is located in the interior of the motor housing portion 81. The second reservoir 10 is located on the upper side of the stator 30. The second reservoir 10 is supported by the stator 30 from the lower side, and is arranged on the motor 2. The second reservoir 10 is made of, for example, a resin material.

In the present preferred embodiment, the second reservoir 10 is in the shape of a gutter, opening upward. The second reservoir 10 is arranged to store the oil O. In the present preferred embodiment, the second reservoir 10 is arranged to store a portion of the oil O which has been fed into the interior of the motor housing portion 81 through the third flow passage 92c. The second reservoir 10 includes feed openings 10a arranged to feed the oil O to the coil ends 33a and 33b. The oil O stored in the second reservoir 10 can thus be fed to the stator 30.

The oil O fed from the second reservoir 10 to the stator 30 drips downward, and is gathered in the lower region in the interior of the motor housing portion 81. The oil O gathered in the lower region in the interior of the motor housing portion 81 travels into the gear housing portion 82 through the partition opening 68 defined in the partition 61c. In the above-described manner, the second oil passage 92 feeds the oil O to the stator 30.

Figure 6:
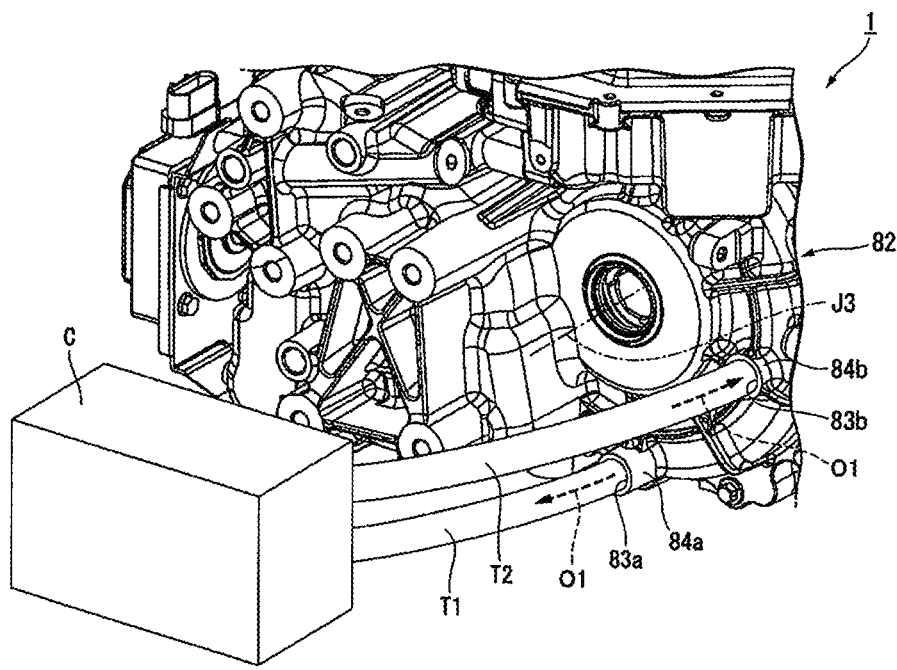
FIG. 6 is a perspective view illustrating a portion of a step of an oil changing method according to a preferred embodiment of the present invention.

In the present preferred embodiment, the oil O housed in the interior of the gear housing portion 82 in the drive apparatus 1 can be changed using an oil changer C illustrated in FIG. 6. Referring to FIG. 6, the oil changer C includes an oil drain tube T1 and an oil feed tube T2 to be connected to the drive apparatus 1. An oil changing method for changing the oil O using the oil changer C according to the present preferred embodiment includes a connecting step, a first changing step, a cleaning step, a second changing step, and a removing step. FIG. 6 illustrates a portion of a process of the cleaning step.

The connecting step is a step of connecting the oil changer C to the drive apparatus 1. An operator or the like removes the first stopper member 100 from the oil drain hole 83a, and connects the oil drain tube T1 to the oil drain hole 83a. The operator or the like removes the second stopper member 101 from the oil feed hole 83b, and connects the oil feed tube T2 to the oil feed hole 83b. The operator or the like thus connects the oil changer C to the drive apparatus 1.

Note that the wording "operator or the like" as used herein includes an operating person who performs an operation, an operating device that performs an operation, and the like. An operation may be performed by only an operating person, by only an operating device, or by an operating person and an operating device.

The first changing step is a step of replacing the oil O housed in the interior of the gear housing portion 82 with a first oil O1 using the oil changer C. The operator or the like causes the oil changer C to operate to change the oil O. The oil changer C causes the oil O housed in the interior of the gear housing portion 82 to be drained out through the oil drain hole 83a and the oil drain tube T1. The oil changer C feeds the first oil O1 into the interior of the gear housing portion 82 through the oil feed tube T2 and the oil feed hole 83b. The oil O housed in the gear housing portion 82 is thus replaced with the first oil O1.

Here, the first oil O1 may be, for example, either the same oil as the oil O used in the drive apparatus 1, or an oil different from the oil O used in the drive apparatus 1. In the case where the first oil O1 is different from the oil O, the first oil O1 may be an oil inferior in quality to the oil O. In this case, because a relatively inexpensive oil can be used as the first oil O1, a reduction in a cost required for the oil change can be achieved.

The cleaning step is a step of causing the first oil O1 to circulate between the gear housing portion 82 and the oil changer C. Referring to FIG. 6, the oil changer C causes the first oil O1 in the interior of the gear housing portion 82 to flow into an interior of the oil changer C through the oil drain tube T1, and at the same time causes the first oil O1 which has been caused to flow into the interior of the oil changer C to flow back into the interior of the gear housing portion 82 through the oil feed tube T2. The oil changer C thus causes the first oil O1 to circulate between the gear housing portion 82 and the oil changer C.

Here, extraneous objects or the like adhered to an inner wall surface of the gear housing portion 82 may be mixed into the first oil O1 which has flowed into the interior of the gear housing portion 82. Examples of the extraneous objects or the like adhered to the inner wall surface of the gear housing portion 82 include wear particles which are generated from the gears of the reduction gear 4, the gears of the differential 5, and so on. Accordingly, a filter (not shown) is arranged in the interior of the oil changer C. Then, in the cleaning step, the first oil O1 is passed through the filter (not shown) after flowing out of the gear housing portion 82 and into the oil changer C. The extraneous objects or the like mixed into the first oil O1 can thus be removed through the filter. Therefore, the circulation of the first oil O1 causes the extraneous objects or the like in the interior of the gear housing portion 82 to be discharged into the interior of the oil changer C through the first oil O1, thus cleaning the interior of the gear housing portion 82. The oil changer C may continue the cleaning step until a new extraneous object or the like ceases to be adhered to the filter (not shown), for example.

The second changing step is a step of replacing the first oil O1 housed in the interior of the gear housing portion 82 with a second oil using the oil changer C. The second changing step is performed after the cleaning of the interior of the gear housing portion 82 in the cleaning step is finished. In the second changing step, the oil changer C causes the first oil O1 housed in the interior of the gear housing portion 82 to be drained out through the oil drain hole 83a and the oil drain tube T1. The oil changer C feeds the second oil into the interior of the gear housing portion 82 through the oil feed tube T2 and the oil feed hole 83b. The first oil O1 housed in the gear housing portion 82 is thus replaced with the second oil. The second oil is the same oil as the oil O used in the drive apparatus 1. As a result of the second changing step, the oil O housed in the interior of the gear housing portion 82 is replaced with a new oil O, i.e., the second oil.

The removing step is a step of removing the oil changer C from the drive apparatus 1. The operator or the like stops the oil changer C, and removes the oil drain tube T1 and the oil feed tube T2 from the oil drain hole 83a and the oil feed hole 83b, respectively. The operator or the like screws the first stopper member 100 into the oil drain hole 83a to close the oil drain hole 83a. The operator or the like screws the second stopper member 101 into the oil feed hole 83b to close the oil feed hole 83b. The change of the oil O is thus finished.

The oil O may be regularly changed by the oil changing method as described above to reduce the likelihood that an extraneous object or the like will be mixed into the oil O in the interior of the housing 6. This in turn reduces the likelihood that a feed of the oil O to the motor 2 will cause a malfunction of the motor 2 due to an extraneous object or the like. In addition, an improvement in performance of the oil O in cooling the motor 2 can be achieved.

Note that the oil pump 96 may be caused to operate in at least one of the steps of the above-described oil changing method. The operation of the oil pump 96 causes any oil O remaining in the second oil passage 92 to be fed to the stator 30 and then to travel into the oil pool P. Therefore, the operation of the oil pump 96 in the first changing step or the second changing step, for example, will cause any oil O remaining in the second oil passage 92 to be replaced with the first oil O1 or the second oil. In addition, the operation of the oil pump 96 in the cleaning step, for example, will cause the first oil O1 to circulate along the second oil passage 92 within the drive apparatus 1. This will cause an extraneous object or the like adhered to an inner wall surface of a channel of the second oil passage 92 to be removed through the first oil O1. The second oil passage 92 can thus be cleaned through the first oil O1.

According to the present preferred embodiment, each of the oil drain hole 83a and the oil feed hole 83b is defined in the portion of the gear housing portion 82 which houses the differential 5. Therefore, when the drive apparatus 1 is installed in the vehicle, each of the oil drain hole 83a and the oil feed hole 83b can be arranged at a position close to the axle 55. This will make it easy for the operator or the like to perform the removal of the first stopper member 100 and the second stopper member 101, the connection of the oil drain tube T1 to the oil drain hole 83a, the connection of the oil feed tube T2 to the oil feed hole 83b, and so on from the lower side of the vehicle. Accordingly, attaching the oil changer C to the drive apparatus 1 will be easy. Thus, it will be easy to change the oil O housed in the interior of the housing 6.

In addition, the differential 5 includes the ring gear 51, a portion of which soaks in the oil O housed in the interior of the gear housing portion 82. In the case of this structure, the oil O is scraped up from the oil pool P by the rotation of the ring gear 51 as described above, so that the oil O is fed to the motor 2. Thus, the drive apparatus 1 is structured such that the oil O is easily gathered particularly in an interior of the portion of the gear housing portion 82 which houses the differential 5. Accordingly, the oil O can be appropriately drained out through the oil drain hole 83a when the oil drain hole 83a is defined in the portion of the gear housing portion 82 which houses the differential 5. Thus, a reduction in the likelihood that any oil O will be left in the interior of the gear housing portion 82 when the oil O is drained out from the interior of the gear housing portion 82 can be achieved. This makes it easier to appropriately change the oil O housed in the interior of the housing 6.

In addition, according to the present preferred embodiment, the oil drain hole 83a is defined in the lower end portion of the portion of the gear housing portion 82 which houses the differential 5. This makes it easier to more appropriately drain out the oil O gathered in a lower end portion of the interior of the gear housing portion 82 through the oil drain hole 83a. This in turn makes it easier to more appropriately change the oil O housed in the interior of the housing 6.

In addition, according to the present preferred embodiment, the oil drain hole 83a is located on the lower side of the differential axis J3 when viewed along the axial direction of the differential axis J3. The oil O is easily gathered particularly in a portion of the interior of the gear housing portion 82 which lies on the lower side of the differential axis J3 to allow the lower end portion of the ring gear 51, which rotates about the differential axis J3, to soak in the oil O. Accordingly, the oil O in the interior of the gear housing portion 82 can be more easily drained out through the oil drain hole 83a when the oil drain hole 83a is defined at a position on the lower side of the differential axis J3 when viewed along the axial direction of the differential axis J3. This makes it easier to more appropriately change the oil O housed in the interior of the housing 6.

In addition, according to the present preferred embodiment, the oil feed hole 83b is located higher than the oil drain hole 83a and lower than the differential axis J3. Here, the oil surface S of the oil pool P which is defined by the oil O fed into the interior of the gear housing portion 82 through the oil feed hole 83b is lower than the oil feed hole 83b. Thus, the oil surface S of the oil pool P in the interior of the gear housing portion 82 can be made lower than the differential axis J3 when the oil feed hole 83b is arranged at a position lower than the differential axis J3. Thus, the oil surface S of the oil pool P in the interior of the gear housing portion 82 can be easily made lower than the axles 55 to prevent the axles 55 from soaking in the oil O in the interior of the gear housing portion 82. Accordingly, a reduction in the likelihood that resistance of the oil O will be applied to the axles 55 when the axles 55 are caused to rotate by the drive apparatus 1 can be achieved, leading to improved driving efficiency of the drive apparatus 1.

In addition, according to the present preferred embodiment, the oil feed hole 83b is located lower than the axles 55. Thus, the oil surface S of the oil pool P in the interior of the gear housing portion 82 can be made lower than the axles 55. This further reduces the likelihood that resistance of the oil O will be applied to the axles 55, since the axles 55 do not soak in the oil O in the interior of the gear housing portion 82. Thus, an additional improvement in the driving efficiency of the drive apparatus 1 can be achieved.

In addition, according to the present preferred embodiment, each of the oil drain hole 83a and the oil feed hole 83b is defined in the second side wall portion 82g located on the left side of the differential 5. This makes it easier to connect the oil drain tube T1 and the oil feed tube T2 of the oil changer C to the oil drain hole 83a and the oil feed hole 83b, respectively, than in the case where each of the oil drain hole 83a and the oil feed hole 83b is defined in a surface of the gear housing portion 82 on the lower side, for example.

Thus, it is easy to connect the oil changer C to the drive apparatus 1, making it easier to change the oil O housed in the interior of the housing 6.

In addition, according to the present preferred embodiment, the interior of the motor housing portion 81 and the interior of the gear housing portion 82 are joined to each other. Accordingly, the oil O housed in the interior of the motor housing portion 81 is able to travel into the interior of the gear housing portion 82. Accordingly, it is also possible to change the oil O housed in the interior of the motor housing portion 81 through the oil drain hole 83a and the oil feed hole 83b defined in the gear housing portion 82.

The present invention is not limited to the above-described preferred embodiment, and other structures and methods may be adopted in other preferred embodiments of the present invention. Any desired change or modification may be made to each of the oil drain hole and the oil feed hole as long as each of the oil drain hole and the oil feed hole is defined in the portion of the gear housing portion which houses the differential. Relative positions of the oil drain hole and the oil feed hole may be modified in any desired manner. Each of the oil drain hole and the oil feed hole may be defined in, for example, the bottom portion of the gear housing portion. The oil drain hole and the oil feed hole may be defined in mutually different portions of the gear housing portion. For example, one of the oil drain hole and the oil feed hole may be defined in the bottom portion of the gear housing portion with the other one of the oil drain hole and the oil feed hole being defined in a side wall portion of the gear housing portion. Each of the oil drain hole and the oil feed hole may not be defined in the portion of the gear housing portion which houses the differential. In this case, the oil drain hole is defined in the lower end portion of the housing. Even in this case, it is possible to make it easy to drain out the oil through the oil drain hole, making it easy to change the oil housed in the interior of the housing. The oil feed hole may not be provided.

Any desired change or modification may be made to the first stopper member as long as the first stopper member is removably fitted in the oil drain hole to close the oil drain hole. Any desired change or modification may be made to the second stopper member as long as the second stopper member is removably fitted in the oil feed hole to close the oil feed hole. Each of the first stopper member and the second stopper member may not be a bolt. Each of the first stopper member and the second stopper member may alternatively be, for example, an elastic member made of rubber or the like. In this case, the first stopper member may be, for example, press fitted into the oil drain hole with a small amount of force. The second stopper member may be, for example, press fitted into the oil feed hole with a small amount of force.

The drive apparatuses as described above may be used for any desired purpose. The method for changing the oil in each of the drive apparatuses as described above is not limited to the above-described oil changing method or other particular methods. Features as described above in the present specification may be combined appropriately as long as no conflict arises.

What is claimed is:
1. A drive apparatus for rotating an axle of a vehicle, the drive apparatus comprising:
   a motor;
   a reduction gear connected to the motor;
   a differential connected to the reduction gear, and arranged to rotate the axle about a differential axis;

a housing including a gear housing portion arranged to house the reduction gear and the differential in an interior thereof; and oil housed in the interior of the gear housing portion, wherein the differential includes a ring gear arranged to rotate about the differential axis;

an end portion of the ring gear on a lower side in a vertical direction is located lower than the reduction gear in the vertical direction, and is arranged to soak in the oil in the interior of the gear housing portion;

the housing further includes:
- a plurality of mounting holes for mounting the drive apparatus on a body of the vehicle, wherein two of the plurality of mounting holes overlap the ring gear when viewed along the differential axis;
- an oil drain hole and an oil feed hole each of which is arranged to join the interior of the housing and a space outside the housing to each other;
- a first stopper member removably fitted in the oil drain hole to close the oil drain hole; and
- a second stopper member removably fitted in the oil feed hole to close the oil feed hole;

each of the oil drain hole and the oil feed hole is defined in a portion of the gear housing portion which houses the differential; and when viewed along an axial direction of the differential axis,
- an entirety of the oil feed hole is arranged to overlap the ring gear, and
- an upper portion of the oil drain hole is arranged to overlap the ring gear.

2. The drive apparatus according to claim 1, wherein the oil drain hole is defined in a lower end portion of the portion of the gear housing portion which houses the differential.

3. The drive apparatus according to claim 1, wherein the oil drain hole is located on a lower side of the differential axis in the vertical direction when viewed along the axial direction of the differential axis.

4. The drive apparatus according to claim 1, wherein the oil feed hole is located higher than the oil drain hole and lower than the differential axis in the vertical direction.

5. The drive apparatus according to claim 4, wherein the oil feed hole is located lower than the axle in the vertical direction.

6. The drive apparatus according to claim 1, wherein
the gear housing portion includes a side wall portion located on one side of the differential in the axial direction of the differential axis; and
each of the oil drain hole and the oil feed hole is defined in the side wall portion.

7. The drive apparatus according to claim 1, wherein
the housing includes a motor housing portion arranged to house the motor in the interior thereof;
oil is housed in the interior of the motor housing portion; and
the interior of the motor housing portion and the interior of the gear housing portion are joined to each other.

8. The drive apparatus according to claim 1, wherein
the housing comprises a partition dividing the motor housing portion from the gear housing portion in the axial direction,
the gear housing portion has a side wall opposite to the partition in the axial direction, and the oil drain hole and the oil feed hole are defined in the side wall,
the reduction gear comprises a larger gear connected to the motor, and a smaller gear engaged with the ring gear,
the larger gear and the smaller gear are connected to each other and are rotatable about an intermediate axis parallel to the differential axis, and
along the axial direction, the larger gear is farther from the motor than the smaller gear and the ring gear.

9. A drive apparatus for rotating an axle of a vehicle, the drive apparatus comprising:
a motor;
a reduction gear connected to the motor;
a differential connected to the reduction gear, and arranged to rotate the axle about a differential axis;
a housing including a gear housing portion arranged to house the reduction gear and the differential in an interior thereof; and
oil housed in the interior of the gear housing portion, wherein the differential includes a ring gear arranged to rotate about the differential axis;

an end portion of the ring gear on a lower side in a vertical direction is located lower than the reduction gear in the vertical direction, and is arranged to soak in the oil in the interior of the gear housing portion;

the housing further includes:
- a plurality of mounting holes for mounting the drive apparatus on a body of the vehicle, wherein two of the plurality of mounting holes overlap the ring gear when viewed along the differential axis;
- an oil drain hole and an oil feed hole each of which is arranged to join the interior of the housing and a space outside the housing to each other;
- a first stopper member removably fitted in the oil drain hole to close the oil drain hole; and
- a second stopper member removably fitted in the oil feed hole to close the oil feed hole;

each of the oil drain hole and the oil feed hole is defined in a portion of the gear housing portion which houses the differential; and when viewed along an axial direction of the differential axis, an entirety of the oil feed hole is arranged to overlap the ring gear.

10. The drive apparatus according to claim 9, wherein the oil drain hole is defined in a lower end portion of the portion of the gear housing portion which houses the differential.

11. The drive apparatus according to claim 9, wherein the oil drain hole is located on a lower side of the differential axis in the vertical direction when viewed along the axial direction of the differential axis.

12. The drive apparatus according to claim 9, wherein the oil feed hole is located higher than the oil drain hole and lower than the differential axis in the vertical direction.

13. The drive apparatus according to claim 12, wherein the oil feed hole is located lower than the axle in the vertical direction.

14. The drive apparatus according to claim 9, wherein
the gear housing portion includes a side wall portion located on one side of the differential in the axial direction of the differential axis; and
each of the oil drain hole and the oil feed hole is defined in the side wall portion.

15. The drive apparatus according to claim 9, wherein
the housing includes a motor housing portion arranged to house the motor in the interior thereof;
oil is housed in the interior of the motor housing portion; and the interior of the motor housing portion and the interior of the gear housing portion are joined to each other.

16. A drive apparatus for rotating an axle of a vehicle, the drive apparatus comprising:
- a motor;
- a reduction gear connected to the motor;
- a differential connected to the reduction gear, and arranged to rotate the axle about a differential axis;
- a housing including:
  - a motor housing portion arranged to house the motor in an interior thereof, and
  - a gear housing portion arranged to house the reduction gear and the differential in an interior thereof; and
- oil housed in the interior of the motor housing portion and the interior of the gear housing portion; wherein
- the interior of the motor housing portion and the interior of the gear housing portion are joined to each other;
- the differential includes a ring gear arranged to rotate about the differential axis;
- an end portion of the ring gear on a lower side in a vertical direction is located lower than the reduction gear in the vertical direction, and is arranged to soak in the oil in the interior of the gear housing portion;
- the housing further includes:
  - a plurality of mounting holes for mounting the drive apparatus on a body of the vehicle, wherein two of the plurality of mounting holes overlap the ring gear when viewed along the differential axis;
  - an oil drain hole arranged to join the interior of the housing and a space outside the housing to each other; and
  - a first stopper member removably fitted in the oil drain hole to close the oil drain hole;
- the oil drain hole is defined in an end portion of the housing on the lower side in the vertical direction; and
- when viewed along an axial direction of the differential axis, an upper portion of the oil drain hole is arranged to overlap the ring gear.

17. The drive apparatus according to claim 16, wherein the housing further includes an oil feed hole arranged to join the interior of the housing and the space outside the housing to each other; and
when viewed along the axial direction of the differential axis, the whole oil feed hole is arranged to overlap the ring gear.

* * * * *